United States Patent Office 3,649,704
Patented Mar. 14, 1972

3,649,704
HYDROCARBON ISOMERIZATION PROCESS
John C. Hayes, Palatine, Ill., assignor to Universal Oil Products Company, Des Plaines, Ill.
No Drawing. Continuation-in-part of application Ser. No. 828,762, May 28, 1969. This application July 9, 1969, Ser. No. 840,527
Int. Cl. C07c 5/30, 15/04
U.S. Cl. 260—668 A
22 Claims

ABSTRACT OF THE DISCLOSURE

Isomerizable hydrocarbons are isomerized using a catalytic composite comprising a combination of a platinum group component, a germanium component, and a halogen component with a porous carrier material wherein the germanium component is present in an oxidation state above that of the elemental metal. A catalytic composite comprising a platinum group component, a germanium component, and a Friedel-Crafts metal halide component combined with a refractory inorganic oxide is also disclosed.

CROSS-REFERENCES TO RELATED APPLICATIONS

This application is a continuation-in-part of my copending application Ser. No. 828,762, filed May 28, 1969, now U.S. Pat. No. 3,578,584, filed May 11, 1971, the teachings of which are specifically incorporated herein.

BACKGROUND OF THE INVENTION

This invention relates to a process for isomerizing isomerizable hydrocarbons including isomerizable paraffins, cycloparaffins, olefins, and alkylaromatics. More particularly, this invention relates to a process for isomerizing isomerizable hydrocarbons with a catalytic composite comprising a combination of a platinum group component, a germanium component, and a halogen component with a porous carrier material wherein the germanium component is present in an oxidation state above that of the elemental metal. More precisely, the present invention involves a process utilizing a dual-function catalytic composite having both a hydrogenation-dehydrogenation function and a cracking function which enables substantial improvements in hydrocarbon isomerization processes that have traditionally used dual-function catalysts.

Isomerization processes for the isomerization of hydrocarbons have acquired significant importance within the petrochemical and petroleum refining industry. The demand for the various xylene isomers, particularly para-xylene, has resulted in a need for processes for isomerizing the other xylene isomers and ethylbenzene to produce the desired para-xylene. Also, the need for branched chain paraffins such as isobutane or isopentane as intermediates for the production of high octane motor fuel alkylate can be met by isomerizing the corresponding normal paraffins. In addition, in this motor fuel produced by paraffin-olefin alkylation, it is desired that the final alkylate be highly branched to insure a high octane rating. This can be accomplished by alkylating isobutane or isopentane with a $C_4$–$C_7$ internal olefin which, in turn, can be produced by the isomerization of the corresponding linear alpha-olefin, thus, shifting the double bond to a more centrally located position.

Catalytic composites exhibiting a dual hydrogenation-dehydrogenation function and a cracking function are widely used in the petroleum and petrochemical industry to isomerize isomerizable hydrocarbons. These catalysts are generally characterized as having a heavy metal component, such as metals or metallic compounds of Group V through VIII of the Periodic Table, particularly the Group VIII metals, to impart a hydrogenation-dehydrogenation function when associated with an acid-acting adsorptive, refractory inorganic oxide which imparts a cracking function. In these isomerization reactions, it is important that the catalytic composite not only catalyze the specific isomerization reactions involved with a minimum of side reactions by having its dual hydrogenation-dehydrogenation function correctly balanced against its cracking function, but, further, that the catalyst also be able to perform its desired function equally well over prolonged periods of time.

Performance of a given catalyst in a hydrocarbon isomerization process is typically measured by the activity, selectivity, and stability of the catalyst wherein activity refers to its ability to isomerize the hydrocarbon reactants into the corresponding isomers at a specified set of reaction conditions; selectivity refers to the percent of the converted reactants isomerized to form the desired isomerized product and/or products; and stability refers to the rate of change of the selectivity and/or activity of the catalyst.

The principal cause of instability (i.e., loss of selectivity and activity in an original, selective active catalyst) is the formation of coke on the catalytic surface of the catalyst during the course of the reaction; this coke being characterized as a high molecular weight hydrogen-deficient carbonaceous material, typically having an atomic carbon to hydrogen ratio of about 1 or more. Accordingly, a major problem in the hydrocarbon isomerization art is the development of a more active and selective composite that is not as sensitive to the presence of the foregoing carbonaceous materials and/or has the ability to suppress the rate of the formation of these carbonaceous materials on the catalyst. A primary aim of the art is to develop a hydrocarbon isomerization process utilizing a dual-function catalyst having superior activity, selectivity, and stability. In particular, it is desired to have a hydrocarbon isomerization process wherein the isomerizable hydrocarbons are isomerized without excessive cracking or other decomposition reactions occurring which lower the overall yield of the process and make it more difficult and uneconomical to operate.

SUMMARY OF THE INVENTION

Accordingly, it is an object of this invention to provide a process for isomerizing isomerizable hydrocarbons. More specifically, it is an object of this invention to provide an isomerization process using a particular isomerization catalyst effective in isomerizing isomerizable hydrocarbons without introducing undesired decomposition and/or cracking reactions. It is a further object of this invention to provide a process for isomerizing isomerizable hydrocarbons utilizing a dual-function catalyst having superior activity, selectivity, and stability when compared to the existing catalysts available to the art.

An isomerization process has now been developed utilizing a dual-function catalyst which possesses improved activity, selectivity, and stability. Moreover, in the particular case of a $C_8$ alkylaromatic isomerization process, this catalyst produces essentially equilibrium conversion of the $C_8$ alkylaromatics to a desired specific xylene isomer with essentially stoichiometric selectivity without evidencing excessive production of hydrogenated or cracked products. Further, this activity and selectivity is readily maintainable at its originally high levels, thus, yielding a very stable catalytic alkylaromatic isomerization process. This process utilizes a catalyst comprising a combination of a platinum group component, a germanium component, and a halogen component with a porous, refractory carrier material. It is essential that the germanium component utilized in this catalyst be in a positive oxidation state (i.e., either +2 or +4) and that the germanium component be uniformly distributed throughout the porous carrier material. To achieve this desired oxidation state and distribution of the germanium component, the presence of a halogen component in the composite is essential. Furthermore, this catalyst must be prepared under carefully controlled conditions hereinafter explained. Thus, the process of the present invention involves utilizing a catalyst wherein a controlled amount of an oxidized germanium component is added to a dual-function hydrocarbon conversion catalyst containing a platinum group component and a halogen component whereby the performance characteristics associated with this process are an improvement over the art.

In a broad embodiment, this invention relates to a process for isomerizing an isomerizable hydrocarbon which comprises contacting said hydrocarbon, at isomerization conditions, with a catalytic composite comprising a combination of a platinum group component, a germanium component, and a halogen component with a porous carrier material wherein the germanium component is present in an oxidation state above that of the elemental metal. In a more limited embodiment this catalytic composite contains, on an elemental basis, about 0.01 to about 2.0 wt. percent platinum group metal, about 0.01 to about 5.0 wt. percent germanium, and about 0.1 to about 5.0 wt. percent halogen.

In a more specific embodiment, this invention relates to the isomerization of either saturated or olefinic isomerizable hydrocarbons by contacting either hydrocarbon with the aforementioned catalytic composites at isomerization conditions which include a temperature of about 0° C. to about 425° C., a pressure of about atmospheric to about 100 atmospheres, and a liquid hourly space velocity of about 0.1 to about 10 hr.$^{-1}$. In another limited embodiment, this process relates to the isomerization of an isomerizable alkylaromatic hydrocarbon by contacting the alkylaromatic with the aforementioned catalytic composites at isomerization conditions which include a temperature of about 0° C. to about 600° C., a pressure of about atmospheric to about 100 atmospheres, a liquid hourly space velocity of about 0.1 to about 20 hr.$^{-1}$ and a hydrogen to hydrocarbon mole ratio of about 1:1 to about 20:1.

In another embodiment, this invention relates to a catalytic composite which comprises a refractory, inorganic oxide having combined therewith a platinum group component, a germanium component, and a Friedel-Crafts metal halide component. This composite is particularly applicable for use in isomerization processes for isomerizing $C_4$ to $C_9$ paraffinic hydrocarbons.

Other objects and embodiments referring to alternative isomerizable hydrocarbons and to alternative catalytic compositions will be found in the following further detailed description of this invention.

DESCRIPTION OF PREFERRED EMBODIMENTS

The process of this invention is applicable to the isomerization of isomerizable hydrocarbons including acyclic paraffins and cyclic naphthenes. It is particularly suitable for the isomerization of straight chain or mildly branched chain paraffins containing 4 or more carbon atoms per molecule such as normal butane, normal pentane, normal hexane, normal heptane, normal octane, etc., and mixtures thereof. Cycloparaffins applicable are those ordinarily containing at least 5 carbon atoms in the ring such as alkylcyclopentanes and cyclohexanes including methylcyclopentane, dimethylcyclopentane, cyclohexane, methylcyclohexane, dimethylcyclohexane, etc. This process also applies to the conversion of mixtures of paraffins and/or naphthenes such as those derived by selective fractionation and distillation of straight-run natural gasolines and naphthas. Such mixtures of paraffins and/or naphthenes include the so-called pentane fractions, hexane fractions, and mixtures thereof. It is not intended, however to limit this invention to these enumerated saturated hydrocarbons, and it is contemplated that straight or branched chain saturated hydrocarbon containing up to about 20 carbon atoms per molecule may be isomerized according to the process of the present invention with $C_4$–$C_9$ hydrocarbons being particularly preferred.

The olefins applicable within this isomerization process are generally a mixture of olefinic hydrocarbons of approximately the same molecular weight, including the 1-isomer, 2-isomer, and other position isomers, capable of undergoing isomerization to an olefin in which the double bond occupies a more centrally located position in the hydrocarbon chain. The process of this invention can be used to provide an olefinic feedstock for motor fuel alkylation purposes containing an optimum amount of the more centrally located double bond isomers, by converting the 1-isomer, or other near terminal position isomers into olefins wherein the double bond is more centrally located in the carbon atoms chain. The process of this invention is thus applicable to the isomerization of isomerizable olefinic hydrocarbons such as the isomerization of 1-butene to 2-butene or the isomerization of the 3 - methyl - 1 - butene to 2 - methyl - 2 - butene. Also, the process of this invention can be utilized to shift the double bond of an olefinic hydrocarbon such as 1-pentene, 1-hexene, 2-hexene, and 4-methyl - 1 - pentene to a more centrally located position so that 2-pentene, 2-hexene, 3-hexene and 4 - methyl - 2 - pentene, respectively, can be obtained. It is not intended to limit this invention to these enumerated olefinic hydrocarbons as it is contemplated that shifting of the double bond to a more centrally located position may be effective in straight or branched chain olefinic hydrocarbons containing up to about 20 carbon atoms per molecule. It is also not intended to limit the scope of this invention to isomerization processes wherein only the olefinic bond is isomerized to a new position but also where the skeletal arrangement of the hydrocarbon is also changed such as the isomerization of 1-pentene to 3-methyl-1-butene and/or 2-methyl-2-butene. Particularly preferred are the $C_4$–$C_7$ isomerizable olefins. The process of this invention also applies to the hydroisomerization of olefins wherein olefins are converted to branched chain paraffins and/or branched olefins.

Further, the process of this invention is also applicable to the isomerization of isomerizable alkylaromatic hydrocarbons including ortho-xylene, meta-xylene, para-xylene, ethylbenzene, the ethyltoluenes, the trimethylbenzenes, the diethylbenzenes, the triethylbenzenes, normal propylbenzene, isopropylbenzene, etc., and mixtures thereof. Preferred isomerizable alkylaromatic hydrocarbons are the monocyclic alkylaromatic hydrocarbons, that is, the alkylbenzene hydrocarbons, particularly the $C_8$ alkylbenzenes and non-equilibrium mixtures of the various $C_8$ aromatic isomers. Higher molecular weight alkylaromatic hydrocarbons such as the alkylnaphthalenes, the alkylanthracenes, the alkylphenanthrenes, etc., are also suitable.

These foregoing isomerizable hydrocarbons may be derived as selective fractions from various naturally occurring petroleum streams either as individual components or as certain boiling range fractions obtained by the selective fractionation and distillation of catalytically cracked gas oil. Thus, the process of this invention may be successfully applied to and utilized for complete conversion of isomerizable hydrocarbons when these isomerizable hydrocarbons are present in minor quantities in various fluid or gaseous streams. Thus, the isomerizable hydrocarbons for use in the process of this invention need not be concentrated. For example, isomerizable hydrocarbons appear in minor quantities in various refinery streams usually diluted with gases such as hydrogen, nitrogen, methane, ethane, propane, etc. These refinery streams containing minor quantities of isomerizable hydrocarbons are obtained in petroleum refineries and various refinery installations including thermal cracking units, catalytic cracking units, thermal reforming units, coking units, polymerization units, dehydrogenation units, etc. Such refinery offstreams have in the past been burned for fuel value since an economical process for the utilization of the hydrocarbon content has not been available. This is particularly true for refinery fluid streams known as off-gas streams containing minor quantities of isomerizable hydrocarbons. In addition, this process is capable of isomerizing aromatic streams such as reformate to produce xylenes, particularly para-xylene, thus upgrading the reformate from its gasoline value to a high petrochemical value.

As indicated the catalyst to be utilized in the process of the present invention comprises a porous carrier material or support having combined therewith a platinum group component, a germanium component, and a halogen component. Considering first the porous carrier material utilized in the catalyst, it is preferred that the material be a porous, adsorptive, high-surface area support having a surface area of about 25 to about 500 m.$^2$/gm. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke, or charcoal; (2) silica or silica gel, clays and silicates including those synthetically prepared and naturally occurring, which may or may not be acid treated, for example, Attapulgus clay, china clay, diatomaceous earth, fuller's earth, kaolin, kieselguhr, pumice, etc.; (3) ceramics, porcelain, crushed firebrick, and bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) crystalline aluminosilicates such as naturally occurring or synthetically prepared mordenite and/or faujasite, either in the hydrogen form or in a form which has been treated with multi-valent cations; and, (6) combinations of these groups. The preferred porous carrier materials for use in the present invention are refractory inorganic oxides with best results obtained with an alumina carrier material. Suitable alumina materials are the crystalline aluminas known as the gamma-, eta-, and theta-alumina with gamma- or eta-alumina giving best results. In addition, the alumina carrier material may contain minor proportions of other well-known refractory inorganic oxides such as silica, zirconia, magnesia, etc.; however, the preferred carrier material is substantially pure gamma- or eta-alumina. Preferred carrier materials have an apparent bulk density of about 0.30 to about 0.70 gm./cc. and surface area characteristics such that the average pore diameter is about 20 to 300 angstroms, the pore volume is about 0.10 to about 1.0 ml./gm. and the surface area is about 100 to about 500 m.$^2$/gm. In general, best results are typically obtained with a gamma-alumina carrier material which is used in the form of spherical particles having a relatively small diameter (i.e., typically about $\frac{1}{16}$ inch), an apparent bulk density of about 0.5 gm./cc., a pore volume of about 0.4 ml./gm., and a surface area of about 175 m.$^2$/gm.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide, to a salt of aluminum such as aluminum chloride, aluminum nitrate, etc., in an amount to form an aluminum hydroxide gel which upon drying and calcining is converted to alumina. The alumina may be formed in any desired shape such as spheres, pills, cakes, extrudates, powders, granules, etc., and utilized in any desired size. For the purpose of the present invention, a particularly preferred form of alumina is the sphere. These alumina spheres may be continuously manufactured by the well known oil drop method which comprises forming an alumina hydrosol by any of the techniques taught in the art and preferably by reacting aluminum metal with hydrochloric acid, combining the hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See the teachings of U.S. Pat. No. 2,620,314 for additional details.

One essential constituent of the catalytic composite to be utilized in the process of the present invention is a germanium component, and it is an essential feature of the present invention that the germanium component is present in the composite in an oxidation state above that of the elemental metal. That is to say, the germanium component will exist in the catalytic composite in either the +2 or +4 oxidation state with the latter being the most likely state. Accordingly, the germanium component will be present in the composite as a chemical compound, such as the oxide, sulfide, halide, etc., wherein the germanium is in the required oxidation state, or as a chemical combination with the carrier material in which combination the germanium exists in this higher oxidation state. On the basis of the evidence currently available, it is believed that the germanium component in the subject composite exists as germanous or germanic oxide. It is important to note that this limitation on the state of the germanium component requires extreme care in the preparation and use of the subject composite in order to insure that it is not subjected to high temperature reduction conditions effective to produce the germanium metal. This germanium component may be incorporated in the catalytic composite in any suitable manner known to the art such as by coprecipitation or cogellation with the porous carrier material, ion exchange with the gelled carrier material or impregnation with the carrier material either after or before it is dried and calcined. It is to be noted that it is intended to include within the scope of the process of the present invention all conventional methods for incorporating a metallic composite in a catalytic composite and the particular method of incorporation used is not deemed to be essential. One method of incorporating the germanium component into the catalytic composite involves coprecipitating the germanium component during the preparation of the preferred carrier material, alumina. This method typically involves the addition of a suitable soluble germanium compound such as germanium tetrachloride to the alumina hydrosol and then combining the hydrosol with a suitable gelling agent and dropping the resulting mixture into an oil bath, etc., as explained in detail hereinbefore. After drying and calcining the resulting gelled carrier material, there is obtained an intimate combination of alumina and germanium oxide. A preferred method of incorporating the germanium component into the catalytic composite involves utilization of a soluble, decomposable compound of germanium to impregnate the porous carrier material. In general, the solvent used in this impregnation step is selected on the basis of the capability to dissolve the desired germanium compound and is preferably an aqueous, acidic solution. Thus, the germanium component may be added to the carrier material by commingling the latter with an aqueous, acidic solution of suitable germanium salt or suitable compound of germanium such as germanium tetrachloride, germanium difluoride, germanium tetrafluoride, germanium di-iodide, germanium monosulfide, and the like compounds. A particularly preferred impregnation solution comprises germanium monooxide dissolved in chlorine water. In general, the germanium component can be impregnated either prior to, simultaneously with, or after the platinum group component is added to the carrier material. However, I have found that excellent results are obtained when the germanium component is impregnated simultaneously with the platinum group component. In fact, I have determined that a preferred impregnation solution contains chloroplatinic acid, hydrogen chloride, and germanous oxide dissolved in chlorine water. Following the impregnation step, the resulting composite is dried and calcined as hereinafter explained.

Regardless of which germanium compound is used in the preferred impregnation step, it is important that the germanium component be uniformly distributed throughout the carrier material. In order to achieve this objective, it is necessary to maintain the pH of the impregnation solution in a range of about 1 to about 7 and to dilute the impregnation solution to a volume which is substantially in excess of the volume of the carrier material which is impregnated. It is preferred to use a volume ratio of impregnation solution to carrier material of at least 1.5:1 and preferably about 2:1 to about 10:1 or more. Similarly, it is preferred to use a relatively long contact time during the impregnation step ranging from about ¼ hour up to about ½ hour or more before drying to remove excess solvent in order to insure a high dispersion of the germanium component on the carrier material. The carrier material is, likewise, preferably constantly agitated during this preferred impregnation step.

As indicated above, the catalyst to be utilized in the process of the present invention also contains a platinum group component. Although the process of the present invention is specifically directed to the use of a catalytic composite containing platinum, it is intended to include other platinum group metals such as palladium, rhodium, ruthenium, osmium, and iridium, particularly palladium. The platinum group component, such as platinum, may exist within the final catalytic composite as a compound such as an oxide, sulfide, halide, etc., or as an elemental metal. Generally, the amount of the platinum group component present in the final catalyst composite is small compared to the quantities of the other components combined therewith. In fact, the platinum group component generally comprises about 0.01 to about 2.0 wt. percent of the final catalytic composite, calculated on an elemental basis. Excellent results are obtained when the catalyst contains about 0.05 to about 1.0 wt. percent of the platinum group metal. The preferred platinum group component is platinum, palladium or a compound of platinum or palladium.

The platinum group component may be incorporated in the catalytic composite in any suitable manner such as coprecipitation or cogellation with the preferred carrier material, or ion exchange or impregnation thereof. The preferred method of preparing the catalyst involves the utilization of a water-soluble, decomposable compound of a platinum group metal to impregnate the carrier material. Thus, the platinum group component may be added to the support by commingling the latter with an aqueous solution of chloroplatinic acid. Other water-soluble compounds of platinum may be employed in impregnation solutions and include ammonium chloroplatinate, bromoplatinic acid, platinum dichloride, platinum tetrachloride hydrate, platinum dichlorocarbonyldichloride, dinitro diaminoplatinum, etc. The utilization of a platinum chloride compound such as chloroplatinic acid is preferred since it facilitates the incorporation of both the platinum component and at least a minor quantity of the halogen component in a single step. Hydrogen chloride is also generally added to the impregnation solution in order to further facilitate the incorporation of the halogen component and to aid in the distribution of the metallic component throughout the carrier material. In addition, it is generally preferred to impregnate the carrier material after it has been calcined in order to minimize the risk of washing away the valuable platinum metal compounds; however, in some cases, it may be advantageous to impregnate the carrier material when it is in a gelled state. Following the impregnation, the resulting impregnated support is dried and subjected to a high temperature calcination or oxidation technique which is explained hereinafter.

Another essential constituent of the catalyst to be utilized in the process of this invention is a halogen component. Although the precise form of the chemistry of the association of the halogen component with the carrier material is not entirely known, it is customary in the art to refer to the halogen component as being combined with the carrier material or with the other ingredients of the catalyst. This combined halogen may be either fluorine, chlorine, iodine, bromine, or mixtures thereof. Of these, fluorine and chlorine are particularly preferred. The halogen may be added to the carrier material in any suitable manner either during preparation of the carrier material or before or after the addition of the other components. For example, the halogen may be added at any stage of the preparation of the carrier material or to the calcined carrier material as an aqueous solution of an acid such as hydrogen fluoride, hydrogen chloride, hydrogen bromide, etc. The halogen component or a portion thereof may be composited with the carrier material during the impregnation of the latter with the platinum group component; for example, through the utilization of a mixture of chloroplatinic acid and hydrogen chloride. In another situation, the alumina hydrosol which is typically utilized to form the preferred alumina carrier material may contain halogen and thus contribute at least a portion of the halogen component to the final composite. The halogen is combined with the carrier material in an amount sufficient to result in a final composite that contains about 0.1 to about 10.0 wt. percent and preferably about 0.1 to about 5.0% by weight halogen calculated on an elemental basis. The exact amount of halogen depends on the activity desired and/or the hydrocarbon to be isomerized. In general, it is preferred to have lesser amounts of halogen present when utilizing the catalyst to isomerize olefins whereas larger amounts are preferred for isomerizing paraffins or alkylaromatics. In particular about 0.1 to about 1.0 wt. percent halogen is sufficient for olefin isomerization processes whereas about 0.2 to about 1.5 wt. percent chlorine and/or about 0.5 to about 3.5 wt. percent fluorine is desired for paraffinic and alkylaromatic isomerization processes.

The halogen component is utilized in the subject composite for two purposes: one involves the traditional enhancement of the acidic function of the resulting composite, the other involves the achievement and maintenance of a uniform distribution of the oxidized germanium component in the carrier material. I have observed that a high dispersion of small crystallites of the germanium component in the carrier material is essential for the maintenance of the germanium component in an oxidized state under the reduction conditions used in the hereinafter described reduction step as well as the reduction conditions encountered in the use of the composite in the isomerization process. One of the principal effects of incorporating the halogen component in the composite is that it acts to hold or fix the germanium component in a highly dispersed state where it is highly resistant to the subsequent reduction conditions. Despite this resistance, it is still necessary to carefully control the conditions to which the composite is subjected in order to insure that the germanium is maintained in an oxidized state; that is to say, prolonged exposure of the composite to hydrogen at temperatures substantially above about 1000° F. is to be avoided.

Relative to the amount of the germanium component contained in the catalytic composite, it is preferably sufficient to constitute about 0.01 to about 5.0 wt. percent of the final composite, calculated on an elemental basis, although substantially higher amounts of germanium may be utilized in some cases. Best results are typically obtained with about 0.05 to about 2.0 wt. percent germanium. In the case where the germanium component is incorporated in the catalyst by coprecipitating it with the preferred alumina carrier material, it is within the scope of the process of the present invention to prepare catalytic composites for use therein containing up to 30 wt. percent germanium, calculated on an elemental basis. Regardless of the absolute amounts of the germanium component and the platinum group component utilized, the atomic ratio of germanium to the platinum group metal contained in the catalyst is preferably selected from the range of about 0.1:1 to about 10:1 with best results achieved at an atomic ratio of about 0.5:1 to 5:1. This is particularly true when the total content of the germanium component plus the platinum group component in the catalytic composite is fixed in the range of about 0.1 to about 3.0 wt. percent thereof, calculated on an elemental germanium and platinum group metal basis. Accordingly, examples of especially preferred catalytic composites are as follows: (1) a catalytic composite comprising 0.5 wt. percent germanium, 0.75 wt. percent platinum, and 0.1 to 5.0 wt. percent halogen combined with an alumina carrier material, (2) a catalytic composite comprising 0.1 wt. percent germanium, 0.65 wt. percent platinum, and 0.1 to 5.0 wt. percent halogen combined with an alumina carrier material, (3) a catalytic composite comprising 0.375 wt. percent germanium, 0.375 wt. percent platinum, and 0.1 to 5.0 wt. percent halogen combined with an alumina carrier material, (4) a catalytic composite comprising 1.0 wt. percent germanium, 0.5 wt. percent platinum, and 0.1 to 5.0 wt. percent halogen combined with an alumina carrier material, (5) a catalytic composite comprising 0.25 wt. percent germanium, 0.375 wt. percent platinum, and 0.1 to 5.0 wt. percent halogen combined with an alumina carrier material, (6) a catalytic composite comprising 0.8 wt. percent germanium, 0.375 wt. percent platinum, and 0.1 to 5.0 wt. percent halogen combined with an alumina carrier material, and, (7) a catalytic composite comprising 0.5 wt. percent germanium, 0.375 wt. percent platinum, and 0.1 to 5.0 wt. percent halogen combined with an alumina carrier material.

Regardless of the details of how the components of the catalyst are combined with the porous carrier material, the final catalyst generally will be dried at a temperature of about 200 to about 600° F. for a period of from about 2 to about 24 hours or more, and finally calcined at a temperature of about 700° F. to about 1100° F. in an air atmosphere for a period of about 0.5 to about 10 hours in order to convert the metallic components substantially to the oxide form. Best results are generally obtained when the halogen content of the catalyst is adjusted during the calcination step by including a halogen or a halogen-containing compound in the air atmosphere utilized. In particular, when the desired halogen component of the catalyst is chlorine, it is preferred to use a mole ratio of $H_2O$ to HCl of about 20:1 to about 100:1 during at least a portion of the calcination step in order to adjust the final chlorine content of the catalyst to a range of about 0.1 to about 5.0 wt. percent.

Although not essential, the resulting calcined catalytic composite can be impregnated with an anhydrous Friedel-Crafts type metal halide, particularly aluminum chloride. Other suitable metal halides include aluminum bromide, ferric chloride, ferric bromide, zinc chloride, beryllium chloride, etc. It is preferred that the porous carrier material be a refractory inorganic oxide containing chemically combined hydroxyl groups such as those contained in silica and any of the other aforementioned refractory inorganic oxides including the various crystalline aluminosilicates and clays. Particularly preferred is alumina.

The presence of chemically combined hydroxyl group in the porous carrier material allows a reaction to occur between the Friedel-Crafts metal halide and the hydroxyl groups of the carrier material. For example, aluminum chloride reacts with the hydroxyl groups of alumina to yield Al—O—$AlCl_2$ active centers which enhance the catalytic behavior of the original platinum-germanium-alumina-halogen composite, particularly for isomerizing $C_4$–$C_9$ paraffins. It is desired that the combined halogen content presently within the calcined composite be within the lower portion of the 0.1 to 10 wt. percent halogen range. This combined halogen substitutes to some degree for the hydroxyl groups which are necessary for the reaction with the Friedel-Crafts metal halide. Some halogen must be present, however, to insure that the germanium component remain in its dispersed oxidation state.

The Friedel-Crafts metal halide can be impregnated onto the calcined catalytic composite containing combined hydroxyl groups by the sublimation of the halide onto the germanium-platinum composite under conditions such that the sublimed metal halide is combined with the hydroxyl groups of the composite. This reaction is typically accompanied by the elimination of about 0.5 to about 2.0 moles of hydrogen chloride per mole of Friedel-Crafts metal halide reacted. For example, in the case of subliming aluminum chloride which sublimes at about 184° C., suitable impregnation temperatures range from about 190° C. to about 700° C., preferably from about 200° C. to about 600° C. The sublimation can be conducted at atmospheric pressure or under increased pressure and in the presence of diluents such as inert gases, hydrogen, and/or light paraffinic hydrocarbons. This impregnation may be conducted batchwise but a preferred method is to pass sublimed $AlCl_3$ vapors in admixture with an inert gas such as hydrogen through a calcined catalyst bed. This method both continuously deposits the aluminum chloride and removes the evolved HCl.

The amount of halide combined with the germanium platinum composite may range from about 1% to about 100% of the original metal halide-free composite. The final composite has unreacted metal halide removed by treating the composite at a temperature above the sublimation temperature of the halide for a time sufficient to remove therefrom any unreacted metal halide. For $AlCl_3$, temperatures of about 400° C. to about 600° C. and times of from about 1 to about 48 hours are sufficient.

It is preferred that the resultant calcined catalytic composite be subjected to a substantially water-free reduction step prior to its use in the conversion of hydrocarbons. This step is designed to insure a uniform and finely divided dispersion of the metallic component throughout the carrier material without reducing the germanium component to the metallic form. Preferably, substantially pure and dry hydrogen (i.e., less than 20 vol. p.p.m. $H_2O$) is used as the reducing agent in this step. The reducing agent is contacted with the calcined catalyst at conditions including a temperature of about 800° F. to about 1000° F. selected to reduce the platinum group component to the metallic state while maintaining the germanium component in an oxidized state. This reduction step may be performed in situ as part of a start-up sequence if precautions are taken to predry the plant to a substantially water-free state and if substantially water-free hydrogen is used. In order to minimize the danger of reducing the germanium component during this step, the duration of this step is preferably less than two hours, and, more typically, about one hour.

The resulting reduced catalytic composite may, in some cases, be beneficially subjected to a presulfiding step designed to incorporate in the catalytic composite from about 0.05 to about 0.50 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1000° F. It is generally a good practice to perform this presulfiding step under substantially water-free conditions.

According to the present invention, a hydrocarbon charge stock and hydrogen are contacted with a catalyst of the type described above in a hydrocarbon isomerization zone. This contacting may be accomplished by using the catalyst in a fixed bed system, a moving bed system, a fluidized bed system, or in a batch type operation; however, in view of the danger of attrition losses of the valuable catalyst and of well-known operational advantages, it is preferred to use a fixed bed system. In this system, a hydrogen-rich gas and the charge stock are preheated by any suitable heating means to the desired reaction temperature and are then passed into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactants may be contacted with the catalyst bed in either upward, downward, or radial flow fashion. In addition, it is to be noted that the reactants may be in a liquid phase, a mixed liquid-vapor phase, or a vapor phase when they contact the catalyst, with best results obtained in the vapor phase.

The process of this invention, utilizing the catalyst hereinbefore set forth, for isomerizing isomerizable olefinic or saturated hydrocarbons is preferably effected in a continuous down-flow fixed bed system. One particular method is continuously passing the hydrocarbon preferably commingled with about 0.1 to about 10 moles or more of hydrogen per mole of hydrocarbon to an isomerization reaction zone containing the catalyst and maintaining the zone at proper isomerization conditions such as a temperature in the range of about 0° C. to about 425° C. or more and a pressure of about atmospheric to about 100 atmospheres or more. The hydrocarbon is passed over the catalyst at a liquid hourly space velocity (defined as volume of liquid hydrocarbon passed per hour per volume of catalyst) of from about 0.1 to about 10 hr.$^{-1}$ or more. In addition, diluents such as argon, nitrogen, etc., may be present. The isomerized product is continuously withdrawn, separated from the reactor effluent, and recovered by conventional means, preferably fractional distillation, while the unreacted starting material may be recycled to form a portion of the feed stock.

Likewise, the process of this invention for isomerizing an isomerizable alkylaromatic hydrocarbon is preferably effected by contacting the aromatic in a reaction zone containing the hereinbefore described catalyst with a fixed catalyst bed by passing the hydrocarbon in a down-flow fashion through the bed while maintaining the zone at proper alkylaromatic isomerization conditions such as a temperature in the range of from about 0° C. to about 600° C. or more and a pressure of atmospheric to about 100 atmospheres or more. The hydrocarbon is passed preferably in admixture with hydrogen at a hydrogen to hydrocarbon mole ratio of about 1:1 to about 25:1 or more at a liquid hourly hydrocarbon space velocity of about 0.1 to about 20 hr.$^{-1}$ or more. Other inert diluents such as nitrogen, argon, etc., may be present. The isomerized product is continuously withdrawn, separated from the reactor effluent by conventional means including fractional distillation or crystallization and recovered.

EXAMPLES

The following examples are given to illustrate the preparation of the catalytic composite to be utilized in the process of this invention and its use in the isomerization of isomerizable hydrocarbons. However, these examples are not presented for purposes of limiting the scope of the invention but in order to further illustrate the embodiments of the present process.

EXAMPLE I

This example demonstrates one method of preparing the preferred catalytic composite to be used in the process of the present invention.

An alumina carrier material comprising 1/16" alumina spheres was prepared by forming an alumina hydroxyl chloride sol by dissolving substantially pure aluminum pellets in a hydrochloric acid solution, adding hexamethylenetetramine to the resulting sol, gelling the resulting solution by dropping it into an oil bath to form spherical particles of an aluminum hydrogel, aging and washing the resulting particles with an ammoniacal solution and finally drying and calcining the aged and washed particles to form spherical particles of gamma-alumina containing about 0.3 wt. percent combined chloride. Additional details as to this method of preparing the preferred carrier material are given in the teachings of U.S. Pat. No. 2,620,314.

A measured amount of germanium dioxide crystals was placed in a porcelain boat and subjected to a reduction treatment with substantially pure hydrogen at a temperature of about 650° C. for about 2 hours. The resulting grayish-black solid material was dissolved in chlorine water to form an aqueous solution of germanium monoxide. An aqueous solution containing chloroplatinic acid and hydrogen chloride was then prepared. The two solutions were then intimately admixed and used to impregnate the gamma-alumina particles in amounts, respectively, calculated to result in a final composite containing 0.25 wt. percent Ge and 0.375 wt. percent Pt. In order to insure uniform distribution of both metallic components throughout the carried material, this impregnation step was performed by adding the carrier material particles to the impregnation mixture with constant agitation. In addition, the volume of the solution was two times the volume of the carrier material particles. The impregnation mixture was maintained in contact with the carrier material particles for a period of about ½ hour at a temperature of about 70° F. Thereafter, the temperature of the impregnation mixture was raised to about 225° F. and the excess solution was evaporated in a period of about 1 hour. The resulting dried particles were then subjected to a calcination treatment in an air atmosphere at a temperature of about 925° F. for about 1 hour. The calcined spheres were then contacted with an air stream containing H$_2$O and HCl in a mole ratio of about 40:1 for about 4 hours at 975° F. in order to adjust the halogen content of the catalyst particles to a value of about 0.90.

The resulting catalyst particles were analyzed and found to contain, on an elemental basis, about 0.375 wt. percent platinum, about 0.25 wt. percent germanium, and about 0.85 wt. percent chloride.

Thereafter, the catalyst particles were subjected to a dry pre-reduction treatment by contacting them with a substantially pure hydrogen stream containing less than 20 vol. p.p.m. H$_2$O at a temperature of about 1000° F., a pressure slightly above atmospheric and a flow rate of the hydrogen stream through the catalyst particles corresponding to a gas hourly space velocity of about 720 hr.$^{-1}$. This pre-reduction step was for a duration of about 1 hour.

EXAMPLE II

A portion of the catalyst prepared in Example I is placed, as an active catalytic composite, in a continuous-flow fixed-bed isomerization pilot plant of conventional design. This plant consists of a nominal 1 inch inside-diameter reactor wherein the catalyst is placed as a fixed bed in the latter portion of the reactor. Tabular alumina is placed above this catalyst to function as a preheat section and to insure isothermal reactor conditions within the catalyst bed. In this reactor, the hydrocarbon charge stock is commingled with hydrogen and heated to the desired isomerization reaction temperature before contacting the hydrocarbon and hydrogen mixture with the catalyst. The resultant effluent is cooled and a normally gaseous and liquid product is recovered and analyzed.

To illustrate the utility of this catalyst to isomerize $C_8$ alkylaromatics, a charge stock containing, on a weight percent basis, 20.0% ethylbenzene, 10.0% para-xylene, 50.0% meta-xylene, and 20.0% ortho-xylene is commingled with about 10 moles of hydrogen per mole of hydrocarbon, and continuously charged at 3.5 liquid hourly space velocity (LHSV) to the reactor which is maintained at a reactor pressure of about 500 p.s.i.g. and a reactor temperature of about 410° C. The resulting product evidences essentially equilibrium conversion to para-xylene with only insignificant amounts of cracked products and hydrogenated products thus indicating an efficient alkylaromatic isomerization process.

EXAMPLE III

Another portion of the catalyst produced by the method of Example I is placed in a continuous-flow fixed-bed isomerization plant as described in Example II. Substantially pure meta-xylene is used as a charge stock. This charge stock is commingled with about 10 moles of hydrogen per mole of hydrocarbon and is continuously passed at 4.0 LHSV to the reactor which is maintained at a pressure of about 400 p.s.i.g. and a temperature of about 390° C. Substantial conversion of meta-xylene to para-xylene is obtained . . . i.e., greater than 80% of equilibrium.

EXAMPLE IV

A catalyst essentially identical to that produced in Example I but containing only 0.40 wt. percent combined halogen is used to isomerize 1-butene in an appropriate pilot plant isomerization reactor, at a reactor pressure of about 500 p.s.i.g. and a reactor temperature of about 130° C. Substantial conversion to 2-butene is observed.

EXAMPLE V

The same catalyst as utilized in Example IV is charged to an appropriate continuous-flow fixed-bed isomerization reactor of conventional design maintained at a reactor pressure of about 1000 p.s.i.g. and a reactor temperature of about 175° C. 3-methyl-1-butene is continuously passed to this reactor with substantial conversion to 2-methyl-2-butene being observed.

EXAMPLE VI

A catalyst, identical to that produced in Example I except that the gamma-alumina particles are contacted with hydrogen fluoride to provide a 2.9 wt. percent combined fluoride content in the catalyst, is placed in an appropriate continuous-flow fixed-bed isomerization reactor of conventional design. This reactor is maintained at a reactor pressure of about 350 p.s.i.g. and a reactor temperature of about 200° C. Normal hexane is continuously charged to the reactor in admixture with hydrogen at a 10:1 hydrogen to hexane mole ratio. An analysis of the resultant product stream shows substantial conversion to 2,2-dimethylbutane, 2,3-dimethylbutane, 2-methylpentane and 3-methylpentane.

EXAMPLE VII

Two hundred grams of the reduced platinum-germanium-alumina composite of Example I are placed in a glass-lined rotating autoclave along with 150 grams of anhydrous aluminum chloride. The autoclave is sealed, pressured with 25 p.s.i.g. of hydrogen, and heated and rotated for 2 hours at 300° C. The autoclave is then allowed to cool, depressed through a caustic scrubber, opened and the final composite removed therefrom. An analysis of the resultant composite indicates about a 15 wt. percent gain based on the original platinum-germanium composite equivalent to the aluminum chloride sublimed and reacted thereon. The caustic scrubber is found to have adsorbed hydrogen chloride equivalent to about 5.0 wt. percent of the original composite corresponding to about 0.8 moles of HCl evolved per mole of aluminum chloride reacted therewith.

EXAMPLE VIII

A portion of the catalyst prepared in Example VII is placed in an appropriate continuous-flow fixed-bed pilot plant isomerization reactor and used to isomerize normal butane. The normal butane is continuously passed to the reactor at a 1.0 liquid hourly space velocity, a 0.5 hydrogen to hydrocarbon mole ratio while the reactor is maintained at a reactor pressure of 450 p.s.i.g. and a reactor temperature of 220° C. Substantial conversion of normal butane to isobutane is observed . . . i.e., approximately a conversion of normal butane to isobutane of about 45 wt. percent of the original normal butane charged to the reactor.

EXAMPLE IX

A portion of the catalyst as prepared in Example I is placed in an appropriate continuous-flow isomerization reactor maintained at a reactor temperature of about 200° C. and a reactor pressure of about 250 p.s.i.g. Methylcyclopentane, in admixture with hydrogen, is continuously passed to this reactor with a substantial conversion to cyclohexane being observed.

I claim as my invention:

1. A process for isomerizing an isomerizable hydrocarbon which comprises contacting said hydrocarbon, at isomerization conditions, with a catalytic composite comprising a combination of a platinum group component, a germanium component, and a halogen component with a porous carrier material wherein the germanium component is present in an oxidation state above that of the elemental metal.

2. The process of claim 1 further characterized in that said catalytic composite contains, on an elemental basis, about 0.01 to about 2.0 wt. percent platinum group component, about 0.01 to about 5.0 wt. percent germanium wherein the atomic ratio of germanium to platinum group component is about 0.1:1 to about 10:1, and about 0.1 to about 5.0 wt. percent halogen.

3. The process of claim 1 further characterized in that said platinum group metal is platinum, palladium, or a compound of platinum or palladium.

4. The process of claim 1 further characterized in that said carrier material is a refractory inorganic oxide.

5. The process of claim 4 further characterized in that said refractory inorganic oxide is alumina.

6. The process of claim 1 further characterized in that said germanium component is germanium oxide.

7. The proces of claim 1 wherein said catalyst has combined therewith a sulfur component in an amount of about 0.05 to about 0.5 wt. percent sulfur, calculated on an elemental sulfur basis.

8. The process of claim 1 further characterized in that said isomerizable hydrocarbon is a saturated hydrocarbon and said isomerization conditions include a temperature of about 0° C. to about 425° C., a pressure of about atmospheric to about 100 atmospheres, and a liquid hourly space velocity of about 0.1 to about 10 hr.$^{-1}$.

9. The process of claim 8 further characterized in that said hydrocarbon is commingled with about 0.1 to about 10 moles of hydrogen per mole of hydrocarbon.

10. The process of claim 8 further characterized in that said hydrocarbon is a paraffinic hydrocarbon.

11. The process of claim 10 further characterized in that said hydrocarbon is a $C_4$–$C_9$ alkane.

12. The process of claim 11 wherein said catalytic composite has combined therewith about 1 to about 100 wt. percent Friedel-Crafts metal halide, calculated on a Friedel-Crafts metal halide-free composite.

13. The process of claim 1 further characterized in that said hydrocarbon is an olefinic hydrocarbon and said isomerization conditions include a temperature of about 0° C. to about 425° C. and a pressure of about atmospheric to about 100 atmospheres.

14. The process of claim 13 further characterized in that said olefin is a $C_4$–$C_7$ isomerizable olefin.

15. The process of claim 1 further characterized in that said isomerizable hydrocarbon is an alkylaromatic hydrocarbon and said isomerization conditions include a temperature of about 0° C. to about 600° C., a pressure of about atmospheric to about 100 atmospheres, and a liquid hourly space velocity of about 0.1 to about 20 hr.$^{-1}$.

16. The process of claim 15 further characterized in that said hydrocarbon is commingled with about 1 to about 25 moles of hydrogen per mole of hydrocarbon.

17. The process of claim 15 further characterized in that said hydrocarbon is a $C_8$ alkylaromatic or a non-equilibrium mixture of $C_8$ alkylaromatics.

18. A catalytic composite comprising a refractory inorganic oxide having combined therewith, on a Friedel-Crafts metal halide-free basis, about 0.01 to about 2.0 wt. percent platinum group metal component, about 0.01 to about 5.0 wt. percent germanium component, calculated on an elemental basis, and about 1.0 to about 100 wt. percent Friedel-Crafts metal halide, the atomic ratio of germanium to platinum group metal being from about 0.1:1 to about 10:1 and the total metal content of the germanium and platinum group components in the composite being from about 0.1 to about 3 wt. percent on elemental basis.

19. The composite of claim 18 further characterized in that said platinum group metal is platinum, palladium, or a compound of platinum or palladium.

20. The composite of claim 18 further characterized in that said metal halide is anhydrous aluminum chloride.

21. The composite of claim 18 wherein a sulfur component is combined therewith in an amount, based on elemental sulfur, of about .05 to about 0.5 wt. percent of the metal halide-free composite.

22. The composite of claim 18 further characterized in that said germanium component is present in an oxidation state above that of the elemental metal.

References Cited

UNITED STATES PATENTS

| | | | |
|---|---|---|---|
| 2,906,700 | 9/1959 | Stine et al. | 252—466 Pt |
| 3,231,517 | 1/1966 | Block et al. | 252—442 |

CURTIS R. DAVIS, Primary Examiner

U.S. Cl. X.R.

252—439, 442, 466 Pt; 260—683.2, 683.7